United States Patent
Machol et al.

(10) Patent No.: US 10,587,555 B2
(45) Date of Patent: Mar. 10, 2020

(54) EVENT LOG ANALYZER

(71) Applicant: SAP Portals Israel Ltd, Ra'anana (IL)

(72) Inventors: Gary Machol, Kfar Saba (IL); Asaf Bruner, Ra'anana (IL); Roy Fishman, Kfar Yona (IL); Sarah Lavie, Tel Mond (IL); Tahel Milstein, Petah Tikvah (IL); Dany Shapiro, Adumin (IL)

(73) Assignee: SAP Portals Israel Ltd., Ra'anana (IL)

( * ) Notice: Subject to any disclaimer, the term of this patent is extended or adjusted under 35 U.S.C. 154(b) by 953 days.

(21) Appl. No.: 14/841,965

(22) Filed: Sep. 1, 2015

(65) Prior Publication Data

US 2017/0063762 A1    Mar. 2, 2017

(51) Int. Cl.
H04L 12/58    (2006.01)

(52) U.S. Cl.
CPC .............. *H04L 51/18* (2013.01); *H04L 51/36* (2013.01)

(58) Field of Classification Search
None
See application file for complete search history.

(56) References Cited

U.S. PATENT DOCUMENTS

| | | | |
|---|---|---|---|
| 6,507,852 B1* | 1/2003 | Dempsey | G06F 17/30368 |
| 8,468,179 B1 | 6/2013 | Rozenwald et al. | |
| 8,856,166 B2 | 10/2014 | Machol et al. | |
| 8,943,059 B2 | 1/2015 | Rozenwald et al. | |
| 2009/0089252 A1* | 4/2009 | Galitsky | G06F 17/30637 |
| 2012/0036397 A1* | 2/2012 | Balani | G06F 11/079 714/38.11 |
| 2012/0131185 A1* | 5/2012 | Petersen | H04L 41/069 709/224 |
| 2013/0185286 A1* | 7/2013 | Galitsky | G06F 17/30637 707/722 |
| 2014/0053025 A1* | 2/2014 | Marvasti | G06F 11/079 714/37 |
| 2014/0344622 A1* | 11/2014 | Huang | G06F 11/079 714/37 |
| 2015/0227838 A1* | 8/2015 | Wang | G06F 11/008 706/12 |
| 2016/0019388 A1* | 1/2016 | Singla | G06F 21/552 726/23 |
| 2016/0072840 A1* | 3/2016 | Iyer | H04L 63/1408 726/1 |

(Continued)

*Primary Examiner* — Shirley X Zhang
(74) *Attorney, Agent, or Firm* — Fish & Richardson P.C.

(57) ABSTRACT

The present disclosure involves systems, software, and computer implemented methods for correlating critical events to identified log data. An example event log analyzer can identify a set of log messages. One or more occurrences of a first critical event and a time of each of the occurrences are identified. One or more candidate subsets of log messages are identified. Each log message in each candidate subset is associated with a timestamp that is within a predefined time window prior to the time of an occurrence of the first critical event. A candidate subset of log messages is selected as a correlator of the first critical event. A rule is defined using the selected candidate subset of log messages. The rule defines a second critical event that correlates to the first critical event. The rule is associated with one or more actions to perform when the second critical event occurs.

13 Claims, 4 Drawing Sheets

(56) References Cited

U.S. PATENT DOCUMENTS

2016/0099898 A1* 4/2016 Watanabe ............... H04L 51/12
           709/204
2016/0180022 A1* 6/2016 Paixao ................. G06F 19/322
           705/3

\* cited by examiner

Actions:

202
1) Send e-mail=<person1 email address> — 202a
2) If (dayofweek=Saturday|Sunday) then
   Send e-mail=<person2 email address> — 202b
   else
   Send e-mail=<person3 emailAddress>
3) SendSMS=<person 3 cell phone number> — 202c
4) Run=orderNewWidgetProcess.exe — 202d
5) Run=predictionEngine.exe — 202e
6) ...

Log Events:

204
1) Server1 (URL: <www.url1...>)
   Search=*Stock*Widgit*Low|Empty — 204a
   Daysofweek=Monday-Friday
   (Search for string Stock*Widgit*Low or Stock*Widgit*Empty)
2) Server2 (URL: <www.url2...>)
   Search=*No*Widget*Orders*Current — 204b
3) Server1 (URL: <www.url1...>) — 204c
   Search=*Memory*low*
4) Server1 (URL: <www.url1...>) — 204d
   Search=ping*received
5) Server2 (URL: <www.url1...>) — 204e
   Search=*execute myApp.exe*
6) ...

Rules:

206
1) Log Events 1 AND Log Events 2 within 3 hours then perform Action 4. — 206a
2) ...

Correlation Engine:

208   NumberMinutesInReverseToScanLogs=120 — 208a

EVENT LOG ANALYZER

TECHNICAL FIELD

The present disclosure relates to computer-implemented methods, software, and systems for automatically correlating log data to critical events.

BACKGROUND

Log management (LM) comprises an approach to dealing with large volumes of computer-generated log messages (also known as audit records, audit trails, and event logs, among other names). LM includes and covers log collection, centralized aggregation, long-term retention, log rotation, log analysis, and log search and reporting. Effectively analyzing large volumes of diverse logs can pose many challenges, including log volume (e.g., 100 s of gigabytes of data per day for a large organization), log format diversity, false log records, and others. Logging can produce technical information usable for the maintenance of applications or websites, including defining whether a reported issue is actually an issue, to analyze, reproduce, and correct identified issues, to test new features in development, and to correct and avoid issues in production systems.

SUMMARY

The present disclosure involves systems, software, and computer implemented methods for automatically correlating log data to critical events. An example event log analyzer can execute a method including operations for identifying log data associated with a set of log messages included in one or more logs. Each log message is associated with a timestamp. One or more occurrences of a first critical event and a time of each of the one or more occurrences are identified. One or more candidate subsets of log messages are identified. Each log message in each candidate subset is associated with a timestamp that is within a predefined time window prior to the time of a particular occurrence of the first critical event. A candidate subset of log messages is selected as a potential correlation to the first critical event. Anile is defined using the selected candidate subset of log messages. The rule defines a second critical event corresponding to the selected candidate subset of log messages that correlates to the first critical event. The rule is associated with one or more actions to perform when the second critical event occurs.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 illustrates example configuration settings.

DETAILED DESCRIPTION

Figure 1:
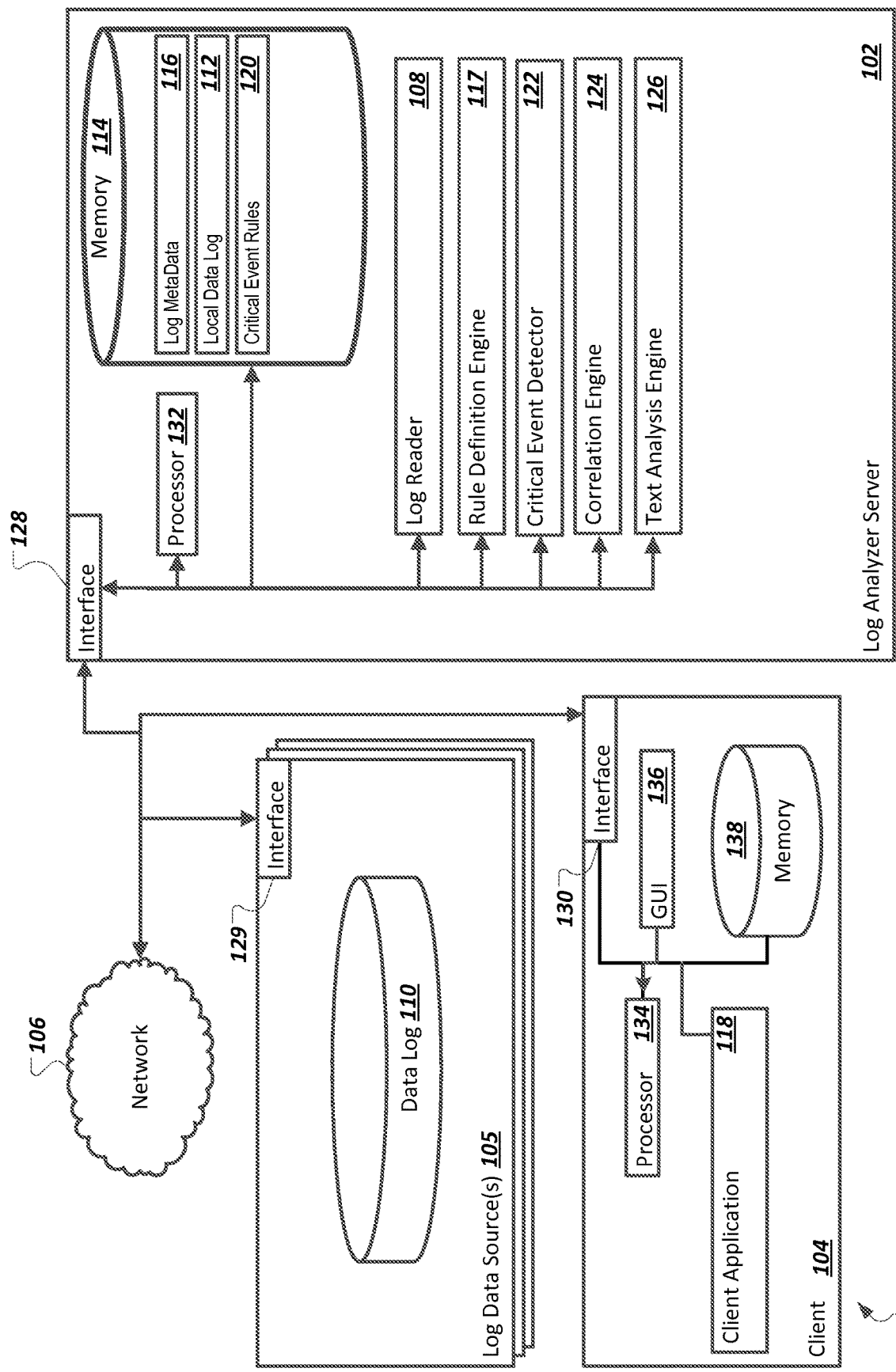
FIG. 1 is a block diagram illustrating an example system for correlating critical events to log data.

An organization can define various business processes to be triggered when a business event occurs. For example, a rule can be defined that specifies one or more actions to perform when a particular type of event occurs. The actions can include the notifying of a predefined party, such as the sending of an electronic message (e.g., text message, email). In some instances, the electronic message can direct the predefined party to initiate one or more processes, actions, or other additional events to respond to the event. The processes can be manual, software, or a mix of manual and software processes. As another example, a rule can be defined that specifies that a software process is to be automatically initiated, without human intervention, upon detection of an event.

An event can be any occurrence of interest to an organization. For example, events can be related to inventory management, software and hardware (e.g., server) status, financial conditions, facilities management, or any other type of business condition. An event can be identified as a critical event which has particular importance to the organization. In addition to responding to an event, an organization may desire to be able to correlate log entries to upcoming events, thereby allowing an event log analyzer to predict an event before the event occurs, particularly for critical events. If the organization is able to predict a critical event using the determined correlation, one or more actions can be performed, such as to prevent or to counteract the critical event. In some instances, particular types of and a first set of critical events may be initially defined by administrators, developers, or a set of default settings.

Information related to events that occur in a monitored system or that are related to one or more applications, operations, or software can be stored in log data generated by one or more systems associated with the organization. For some types of critical events, log data may indicate when a critical event of a particular type occurred. For example, a time of a server crash can be determined or estimated by information logged by the server (for example, a log may include a "server restarting" or a "fatal error" message). For some types of critical events, log information may not indicate a time of the critical event, but the organization may be aware of a time of the occurrence of the critical event.

Given a time of an occurrence of a particular critical event, a log analyzer can analyze log messages that have an associated time before the occurrence of the particular critical event, where the analysis allows the log analyzer to identify one or more correlation log messages which may, alone or in combination, correlate to and potentially predict the particular critical event. A new rule can be defined in the system based on the correlation log messages. The new rule can define a correlation of the log events to the particular critical event as its own new critical event. The new rule can specify that when the one or more correlation log messages appear in log data, one or more actions are to be performed. The actions can include one or more actions to prevent the particular critical event (i.e., the critical event which is predicted based on the determined correlation by the new critical event), prepare for the particular critical event, or notify one or more individuals of the possibility of occurrence of the new critical event and/or a potential upcoming occurrence of the particular critical event.

FIG. 1 is a block diagram illustrating an example system 100 for correlating critical events to log data. Specifically, the illustrated system 100 includes or is communicably coupled with a log analyzer server 102, a client device 104, one or more log data sources 105, and a network 106. Although shown separately, in some implementations, functionality of two or more systems or servers may be provided by a single system or server. In some implementations, the functionality of one illustrated system or server may be provided by multiple systems or servers.

The log analyzer server 102 is configured to detect the occurrence of a critical event and to analyze log data to identify one or more log messages which may correlate with potential future occurrences of the critical event. For example, a log reader 108 included in the log analyzer server 102 can access one or more data logs 110 from one or more log data sources 105. In some implementations, the log reader 108 copies some or all of the data from one or more data logs 110 from one or more log data sources 105 to a local data log 112 stored in memory 114 of the log analyzer server 102. In some implementations, the log reader 108 does not copy data from the data logs 110 to local log data 112, and can, for example, access data directly from the data logs 110 to perform the analysis.

The log reader 108 can access the data logs 110 and/or the local data log 112 and can determine, access, and/or store log metadata 116 from the read log data. The log reader 108 can determine, for example, a set of unique log message types occurring in the accessed log data. The log reader 108 can determine, as log metadata 116, one or more metrics for each unique log message type. For example, the metrics for a log message type can include, for example, one or more of a total count of occurrences of the log message type, a count of occurrences of the log message type for each data log 110, a frequency of occurrence of the log message type (e.g., average frequency per day, average frequency for a given day of week, average frequency for a given day of week and time window (e.g., a predefined hour block, such as 8:00 am-9:00 am), etc.). A metric can be an aggregate for all data logs 110 or can be particular to a given data log 110. In addition to log message frequency, the log metadata 116 can, for example, provide an indication of a distribution of occurrences of a log message type across multiple logs.

A rule definition engine 117 can enable definition of a rule or rules which define critical events. The rule definition engine 117 can, for example, provide a rule definition interface to the client device 104, e.g., for presentation in a client application 118. A user of the client application 118 can use the rule definition interface to define a critical event based on the occurrence of one or more types log messages in the log data 110. A rule for a critical event can specify one or more actions to perform when the critical event occurs. A rule for a critical event can be stored in the memory 114 in critical event rules 120.

A critical event detector 122 can detect an occurrence of a defined critical event. For example, the critical event detector 122 can detect the occurrence of one or more types of log messages in the data logs 110 or the local data log 112 for a rule that is based on the one or more types of log messages. As another example, the critical event detector 122 can be notified of the occurrence of a critical event, such as for a critical event whose definition is not based on log message types (e.g., an occurrence of a critical event of a particular type may not be, or may not always be, reflected in the data logs 110, the log metadata 116, or the local data log 112). A user can provide a user input about the occurrence of a critical event, and the user input can be received by the critical event detector 122. As another example, another application or system can notify the critical event detector 122 about the occurrence of the critical event.

The critical event detector 122 can provide critical event information (e.g., type of critical event, time of occurrence, etc.) for one or more occurrences of a critical event to a correlation engine 124. The correlation engine 124 can analyze one or more of the data logs 110, the local data log 112, and the log metadata 116 to identify one or more log messages which may be, based on the determined correlation, a predictor of the critical event.

The correlation engine 124 can identify candidate predictor or correlation log messages (or sets of candidate correlation log messages) and can determine a likelihood for each candidate correlation log message or set of candidate correlation log messages. The likelihood for a set of one or more candidate log messages can be a confidence measure which indicates a probability that the set of one or more candidate log messages correlates to the critical event.

As described in more detail below, the correlation engine 124 can determine a likelihood for a candidate set of log messages based on a log level of one or more log messages in the set, a frequency of occurrence of one or more log messages in the set, or an identified association between one or more log messages in the set and the critical event. For example, the correlation engine 124 can use a text analysis engine 126 to determine that a log message includes text that relates to text associated with the critical event (e.g., the log message may include a keyword that is the same as or similar to a keyword associated with the critical event). The text analysis engine 126 can use regular expressions, a knowledge graph, or other types or processing to determine that a log message relates to a critical event.

A likelihood for a candidate set of log messages can be based on how many times the set of log messages appears to correlate with, and therefore potentially predict, an occurrence of the critical event. For example, when the critical event detector 122 has identified multiple occurrences of the critical event, the correlation engine 124 can determine the likelihood for a particular candidate set of log messages based on a number of times that each log message in the set occurs in log data within a predetermined time window before one of the identified occurrences of the critical event. As another example, if a particular log message occurs only once, or only a small (e.g., less than a threshold) number of times in the data logs 110, and for each occurrence the particular log message appears in the data logs 110 before an occurrence of the critical event, the particular log message may be correlated to, and therefore a potential predictor of, the critical event.

In some implementations, the correlation engine 124 determines that one or more log messages that were expected to be in the data logs 110 (e.g., based on previously gathered metrics) are not in fact in the data logs 110 in an expected time window. The correlation engine 124 can determine that the lack or absence of the one or more log messages may correlate to and predict, at least in part, the occurrence of the critical event.

The correlation engine 124 can select one or more sets of one or more candidate correlation log messages for presentation to the user, based on the determined likelihoods. For example, the correlation engine 124 can select each set of one or more candidate correlation log messages that has an associated likelihood that is above a predetermined threshold. The candidate correlation log messages can be presented to the user, for example, ranked according to determine likelihoods.

The rule definition engine 117 can provide an interface to be presented in the client application 118 which allows the user to view the selected sets of candidate correlation log messages and to accept or reject a presented set as a correlator, or predictor, of a particular critical event. The interface can allow the user to define a new rule using an accepted set of log messages. The new rule defines a new critical event which correlates to, or predicts, the particular critical event. The user can define one or more actions to be performed when the new event occurs. The new rule and associated action definitions can be stored in the critical event rules 120.

In some implementations, a new rule for a new critical event is automatically defined, without user intervention. For example, a new rule can be automatically defined if a likelihood that a set of candidate correlator log messages predicts an existing critical event exceeds a threshold. The automatically defined critical event can be stored in the critical event rules 120.

The critical event rules 120 can thus grow over time. Initial critical events stored in the critical event rules 120 can be manually entered. New critical events that may be precursor to an existing critical event can be added to the critical event rules 120, as described above. In some implementations, the correlation engine 124 can determine (either automatically or in response to a user input prompt) a critical event that correlates to another correlation critical event (e.g., a first rule may define a first critical event which correlates to, or predicts, an existing, second critical event, and a second rule may define a third critical event which itself correlates to, or predicts, the first critical event). Such determining of predictors of predictors can continue to an indefinite number of levels. As the correlation engine 124 continues to identify correlation critical events, the correlation engine 124 may use a learning engine that dynamically updates one or more of configuration settings, parameters, or prediction algorithms, to more accurately and efficiently identify correlators over time.

As used in the present disclosure, the term "computer" is intended to encompass any suitable processing device. For example, although FIG. 1 illustrates a single log analyzer server 102 and a single client device 104, the system 100 can be implemented using a single, stand-alone computing device, two or more log analyzer servers 102 or two or more clients 104. Indeed, the log analyzer server 102 and the client device 104 may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the log analyzer server 102 and the client device 104 may be adapted to execute any operating system, including Linux, UNIX, Windows, Mac OS®, Java™, Android™, iOS or any other suitable operating system. According to one implementation, the log analyzer server 102 may also include or be communicably coupled with an e-mail server, a Web server, a caching server, a streaming data server, and/or other suitable server.

Interfaces 128, 129, and 130 are used by the log analyzer server 102, the one or more log data sources 105, and the client device 104, respectively, for communicating with other systems in a distributed environment—including within the system 100—connected to the network 106. Generally, the interfaces 128, 129, and 130 each comprise logic encoded in software and/or hardware in a suitable combination and operable to communicate with the network 106. More specifically, the interfaces 128, 129, and 130 may each comprise software supporting one or more communication protocols associated with communications such that the network 106 or interface's hardware is operable to communicate physical signals within and outside of the illustrated system 100.

The log analyzer server 102 includes one or more processors 132. Each processor 132 may be a central processing unit (CPU), a blade, an application specific integrated circuit (ASIC), a field-programmable gate array (FPGA), or another suitable component. Generally, each processor 132 executes instructions and manipulates data to perform the operations of the log analyzer server 102. Specifically, each processor 132 executes the functionality required to receive and respond to requests from the client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The log analyzer server 102 includes the memory 114. In some implementations, the log analyzer server 102 includes multiple memories. The memory 114 may include any type of memory or database module and may take the form of volatile and/or non-volatile memory including, without limitation, magnetic media, optical media, random access memory (RAM), read-only memory (ROM), removable media, or any other suitable local or remote memory component. The memory 114 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the database system 102.

The client device 104 may generally be any computing device operable to connect to or communicate with the database system 102 via the network 106 using a wireline or wireless connection. In general, the client device 104 comprises an electronic computer device operable to receive, transmit, process, and store any appropriate data associated with the system 100 of FIG. 1. The client device 104 can include one or more client applications, including the client application 118. A client application is any type of application that allows the client device 104 to request and view content on the client device 104. In some implementations, a client application can use parameters, metadata, and other information received at launch to access a particular set of data from the log analyzer server 102. In some instances, a client application may be an agent or client-side version of the one or more enterprise applications running on an enterprise server (not shown).

The client device 104 further includes one or more processors 134. Each processor 134 included in the client device 104 may be a central processing unit (CPU), an application specific integrated circuit (ASIC), a field-programmable gate array (FPGA), or another suitable component. Generally, each processor 134 included in the client device 104 executes instructions and manipulates data to perform the operations of the client device 104. Specifically, each processor 134 included in the client device 104 executes the functionality required to send requests to the log analyzer server 102 and to receive and process responses from the log analyzer server 102.

The client device 104 is generally intended to encompass any client computing device such as a laptop/notebook computer, wireless data port, smart phone, personal data assistant (PDA), tablet computing device, one or more processors within these devices, or any other suitable processing device. For example, the client device 104 may comprise a computer that includes an input device, such as a keypad, touch screen, or other device that can accept user information, and an output device that conveys information associated with the operation of the server 102, or the client device 104 itself, including digital data, visual information, or a graphical user interface (GUI) 136.

The GUI 136 of the client device 104 interfaces with at least a portion of the system 100 for any suitable purpose, including generating a visual representation of the client application 118. In particular, the GUI 136 may be used to view and navigate various Web pages. Generally, the GUI 136 provides the user with an efficient and user-friendly presentation of business data provided by or communicated within the system. The GUI 136 may comprise a plurality of customizable frames or views having interactive fields, pull-down lists, and buttons operated by the user. The GUI 136 contemplates any suitable graphical user interface, such as a combination of a generic web browser, intelligent engine, and command line interface (CLI) that processes information and efficiently presents the results to the user visually.

Memory 138 included in the client device 104 may include any memory or database module and may take the form of volatile or non-volatile memory including, without limitation, magnetic media, optical media, random access memory (RAM), read-only memory (ROM), removable media, or any other suitable local or remote memory component. The memory 138 may store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the client device 104.

There may be any number of client devices 104 associated with, or external to, the system 100. For example, while the illustrated system 100 includes one client device 104, alternative implementations of the system 100 may include multiple client devices 104 communicably coupled to the log analyzer server 102 and/or the network 106, or any other number suitable to the purposes of the system 100. Additionally, there may also be one or more additional client devices 104 external to the illustrated portion of system 100 that are capable of interacting with the system 100 via the network 106. Further, the term "client", "client device" and "user" may be used interchangeably as appropriate without departing from the scope of this disclosure. Moreover, while the client device 104 is described in terms of being used by a single user, this disclosure contemplates that many users may use one computer, or that one user may use multiple computers.

FIG. 2 illustrates example configuration settings 202, 204, 206, and 208. The configuration settings can be used, for example, by one or more components of the log analyzer server 102. The configuration settings 202 include pre-defined actions 202a, 202b, 202c, 202d, and 202e. Each of the pre-defined actions 202a-202e can be included in a rule which specifies that one or more actions are to be performed when a critical event occurs. The action 202a is configured to cause the sending of an e-mail message to a specified person. The action 202b is configured to cause the sending of an e-mail address to a first specified person if the day of week is Saturday or Sunday and to a second specified person if the day of week is a day other than Saturday or Sunday. The action 202c is configured to cause the sending of a SMS (Simple Message Service, e.g., "text") message to a specified phone number. The action 202d is configured to cause the running of an "Order New Widget" process. The action 202e is configured to cause the running of a correlation engine process, such as by the correlation engine 124.

The configuration settings 204 include pre-defined log events 204a, 204b, 204c, 204d, and 204e. The log event 204a is defined as an event occurring in log data associated with a "Server1" server that has an associated URL (Uniform Resource Locator) beginning with "www.url1". The event 204a occurs if one or more log messages in the log data associated with the "Server1" server have a timestamp indicating a day of week of Monday through Friday and include the text "Stock", "Widget", and either "Low" or "Empty". The log event 204b is defined as an event occurring in log data associated with a "Server2" server that has an associated URL beginning with "www.url2". The event 204b occurs if one or more log messages in the log data associated with the "Server2" server include the text "No", "Widget", "Orders", and "Current".

The log event 204c occurs if one or more log messages in the log data associated with the "Server1" server include the text "Memory" and "low". The log event 204d occurs if one or more log messages in the log data associated with the "Server1" server include the text "ping" and "received". The log event 204e occurs if one or more log messages in the log data associated with the "Server2" server include the text "execute myApp.exe".

The configuration settings 206 include rule definitions that refer to the predefined log events in the configuration settings 204. For example, a rule 206a refers to the log event 204a and the log event 204b. The rule 206a defines the condition for a critical event. The rule 206a defines that a critical event occurs if the log event 204b occurs within three hours of the log event 204a. The rule 206a specifies that if the log event 204b occurs within three hours of the log event 204a, then "action 4" (e.g., the action 202d, the running of the "orderNewWidgetProcess.exe" program) is to be performed. The rule 206a can be stored, for example, in the critical event rules 120. The rule 206a may have been manually defined, for example, by a user. That is, the user may have manually defined the critical event of the log event 204b occurring within three hours of the log event 204a. As another example, the critical event of the log event 204b occurring within three hours of the log event 204a may have been automatically identified, by the correlation engine 124, as a correlation to, or predictor of, an occurrence of some other critical event. For example, the other critical event may be that a widget was needed for production but no widgets were available. In some implementations, a rule can refer to the action 202e, meaning that if a particular critical event occurs, the correlation engine 124 can be automatically invoked to determine one or more correlation log messages which may correlate to, and therefore be able to predict, future occurrences of the particular critical event.

A rule can include Boolean expressions. For example, a rule can be configured so that particular actions are performed based on a time that an event specified in the rule occurs. For example, if the event(s) specified in the rule occurs during a first time period, a first set of actions can be triggered, and if an event specified in a rule occurs during a second, different time period, another set of actions can be triggered.

The configuration settings 208 include settings corresponding to the correlation engine 124. For example, a setting 208a configures a time window for looking for log messages which may correlate to and therefore predict a critical event. For example, the setting 208a indicates that the correlation engine 124 can consider log messages occurring one hundred twenty or fewer minutes before the occurrence of a critical event as potential correlators of the critical event. In some implementations, multiple settings similar to the setting 208a may exist in the configuration settings 208. For example, different time windows can be configured for different logs. As another example, different time windows can be configured for events of different event types.

Figure 3A:
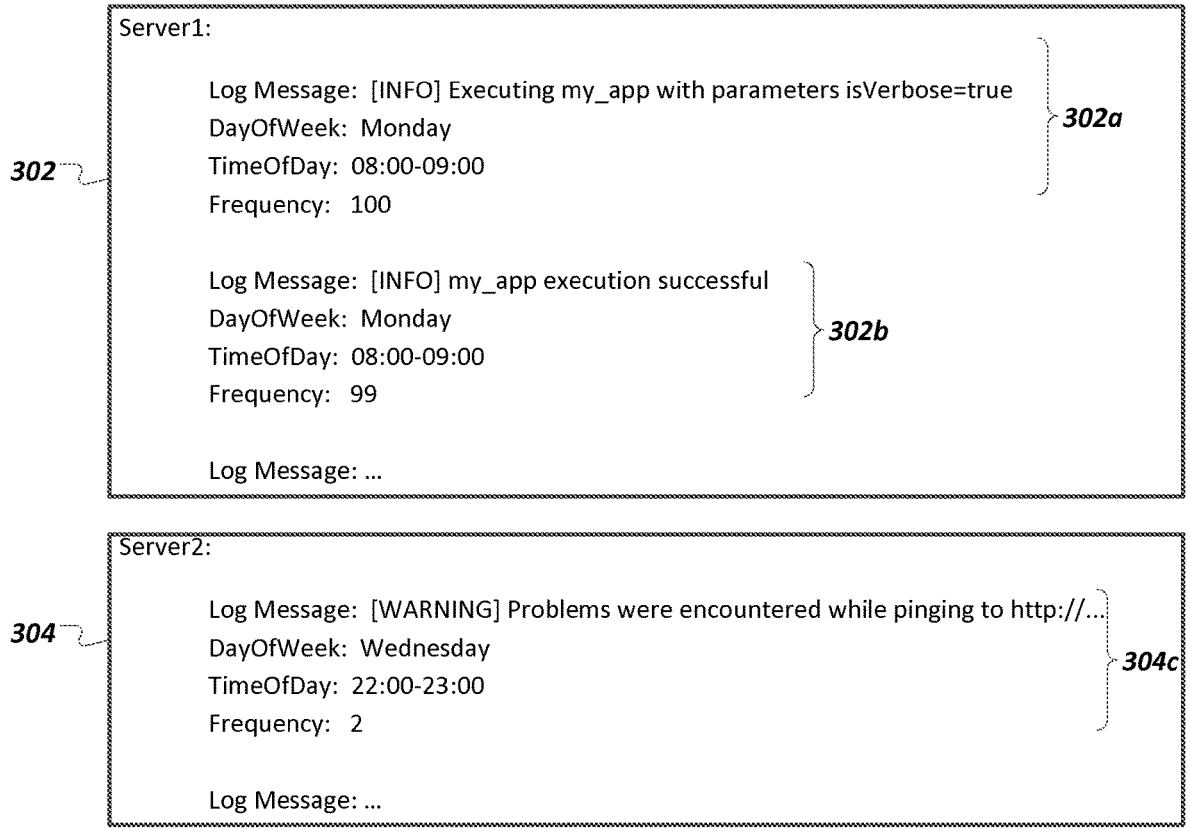
FIG. 3A illustrates example log data metadata.

FIG. 3A illustrates example log data metadata 302 and 304. The log data metadata 302 and 304 include metadata for log data associated with a "Server1" server and a "Server2" server, respectively. The log data metadata 302 respectively includes metadata 302a and 302b for a first log message type and a second log message type associated with the "Server1" server. The first log message type associated with the "Server1" server has log message text of "[INFO] Executing my_app with parameters isVerbose=true". The metadata 302a indicates that on average that there are one hundred occurrences of the first log message type in association with the "Server1" server on Mondays between 8:00 and 9:00. The second log message type associated with the "Server1" server has log message text of "[INFO] my_app execution successful". The metadata 302b indicates that on average that there are forty-eight occurrences of the second log message type in association with the "Server1" server on Tuesdays between 8:00 and 9:00.

The metadata 304 associated with the "Server2" server includes metadata 304c for a third log message type. The third log message type has log message text of "[WARNING] Problems were encountered while pinging to http:// . . . ". The metadata 304c indicates that there on average that there are two occurrences of the third log message type in association with the "Server2" server on Wednesdays between 22:00 and 23:00.

Figure 3B:
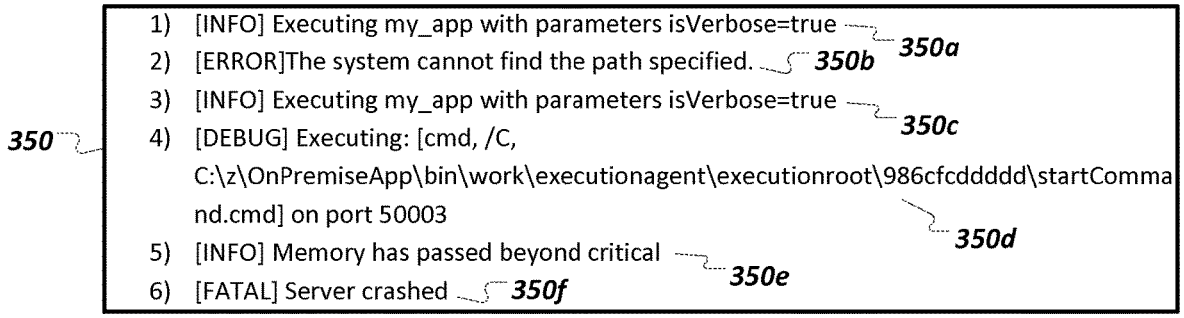
FIG. 3B illustrates example log data.

FIG. 3B illustrates example log data 350. The example log data 350 includes example log messages 350a-350e. The log message 350f can be identified as indicating a server crash critical event. The correlation engine 124 can evaluate the log data 350 and the metadata 302 and 304 to identify a set of log messages in the log data 350 which may correlate to, and potential predict, the server crash critical event associated with the log message 350f. For example, the correlation engine 124 can determine one or more likelihood values which each indicate a likelihood that a given set of one or more log messages correlates to the future server crash critical event. In some implementations, a likelihood is determined for each log message included in the log data 350 other than the log message 350f. In some implementations, a likelihood is determined for one or more sets of two or more log messages.

For example, the correlation engine 124 can determine that the log messages 350a and 350c are common log messages which have a high frequency in the log data 350 and/or in log data associated with one or more servers (e.g., "Server1") in general. Log messages similar to the log message 350a may appear, for example, at many different times, including times that are not within a predetermined time window before an occurrence of a critical event such as the server crash critical event. Accordingly, the correlation engine 124 can disregard the log messages 350a and 350c as possible correlators or predictors of the server crash critical event and/or assign a low likelihood that the log messages 350a and 350e correlate to the server crash critical event. A low log severity level (e.g., "INFO") of the log messages 350a and 350c can contribute to a disregarding of or a low likelihood for the log messages 350a and 350c.

The correlation engine 124 can determine that the log message 350b has a high severity level (e.g., "ERROR"). The high severity level of the log message 350b can increase a likelihood value determined for the log message 350b that the log message 350b correlates to the server crash critical event. In some implementations, a log level included in a predetermined set of log levels is determined to be a high log level. For example, the predetermined set of log levels can include "ERROR", "WARNING", "FATAL", "SEVERE", and other log levels. In some implementations, a log level is represented by a number, and log levels greater than a certain number are determined to be high log severity levels. Other approaches can be used to identify a log message as having a high severity level.

The correlation engine 124 can determine that the log message 350d is a unique log message which has not been seen before in log data analyzed by the correlation engine 124. As another example, the correlation engine 124 can determine that the log message 350d has had a number of occurrences in analyzed log data fewer than a threshold number of occurrences (e.g., five). The correlation engine 124 can determine a likelihood that the log message 350d predicts the server crash critical event based on the uniqueness (or rareness) of the log message 350d.

The correlation engine 124 can determine that the log message 350e is associated with the server crash critical event based on the log message 350e including one or more keywords (e.g., "memory", "critical") that are determined to be associated with a server crash critical event type. The correlation engine 124 can determine a likelihood that the log message 350e predicts the server crash critical event based on the log message 350e being associated with the server crash critical event.

In some implementations, the correlation engine 124 determines a likelihood that a set of log messages correlate to a critical event. For example, the correlation engine 124 can determine a likelihood that a set of the log messages including the log messages 350b, 350d, and 350e correlate the server crash critical event. In some implementations, the likelihood for the set of log messages is based on the likelihoods determined for the individual log messages (e.g., the likelihood for the set of log messages can be an average of the likelihoods of the messages in the set, the same as the lowest likelihood of a message in the set, etc.).

In some implementations, the correlation engine 124 determines a likelihood for a set of one or more log messages based on the set of one or more log messages appearing in log data before multiple occurrences of a critical event. For example, suppose that log data other than the log data 350 indicates multiple, other server crash critical events (e.g., from multiple appearances of the log message 350*f* and/or from other indications of a server crash critical event). Suppose also that the set of log messages 350*b*, 350*d*, and 350*e* appear in the other log data within a predetermined time window before some or all of the other occurrences of the server crash critical event. The correlation engine 124 can determine the likelihood that the set of the log messages 350*b*, 350*d*, and 350*e* correlate to the server crash event based on these occurrences of the log messages 350*b*, 350*d*, and 350*e*.

In some implementations, the lack of an expected log message can be identified as a correlator, or potential predictor, of a critical event. For example, suppose that the log data 350 is associated with log messages occurring in the time window of 8:00 and 9:00 on a Tuesday, and that, as shown, the log data 350 does not include a log message associated with the metadata 302*b*. The correlation engine 124 can determine that the log message associated with the metadata 302*b* was expected to, but did not appear in the log data 350. The absence of the expected log message can be identified as a potential predictor of the critical event associated with the log message 350*f*.

Figure 3C:
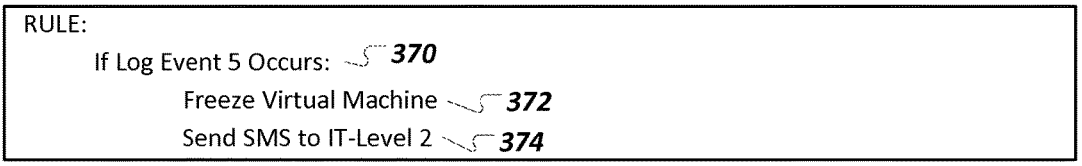
FIG. 3C illustrates an example new rule defining a new critical event which correlates to another critical event.

FIG. 3C illustrates an example new rule 370 defining a new critical event which correlates to another future critical event. As described above, a set of log messages, such as the set of log messages 350*b*, 350*d*, and 350*e*, can be presented to a user as a potential correlator to or of a particular critical event such as the server crash critical event. The sets of log messages may be ranked, ordered, or otherwise presented based on a predicted likelihood of a respective set of one or more log messages correlating to an existing critical event or otherwise being a critical event. The user can select one or more of a presented set of log messages as correlator(s) or predictor(s) of the particular critical event and can define a rule which defines the occurrence of the selected log messages as a new critical event which correlates to the particular critical event. For example, the user can select the log message 350*e* as a predictor and can decline accepting the log messages 350*b* and 350*d* as predictors.

The log message 350*e* can be included in the new rule 370. The new rule 370 defines a new critical event as the occurrence of the log message 350*e*. The rule 370 specifies that when the new critical event occurs, that an action 372 (e.g., "freeze virtual machine") and an action 374 (e.g., "send SMS to IT-Level 1") should be performed. In some implementations, one or more actions associated with the particular critical event which is correlated to and predicted by the new critical event and/or one or more parameters associated with the actions associated with the particular event can be presented to and made available for the user when the user defines the new critical event. For example, the particular critical event (e.g., the server crash critical event associated with the log message 350*f*) can have one or more actions that refer to "IT-Level 2". A parameter value of "IT-Level 2" can be automatically presented as a selectable parameter for an action that is to be included in the new rule. For example, the user can select "IT-Level 2" as a recipient of an SMS message, as shown in the action 374.

Figure 4:
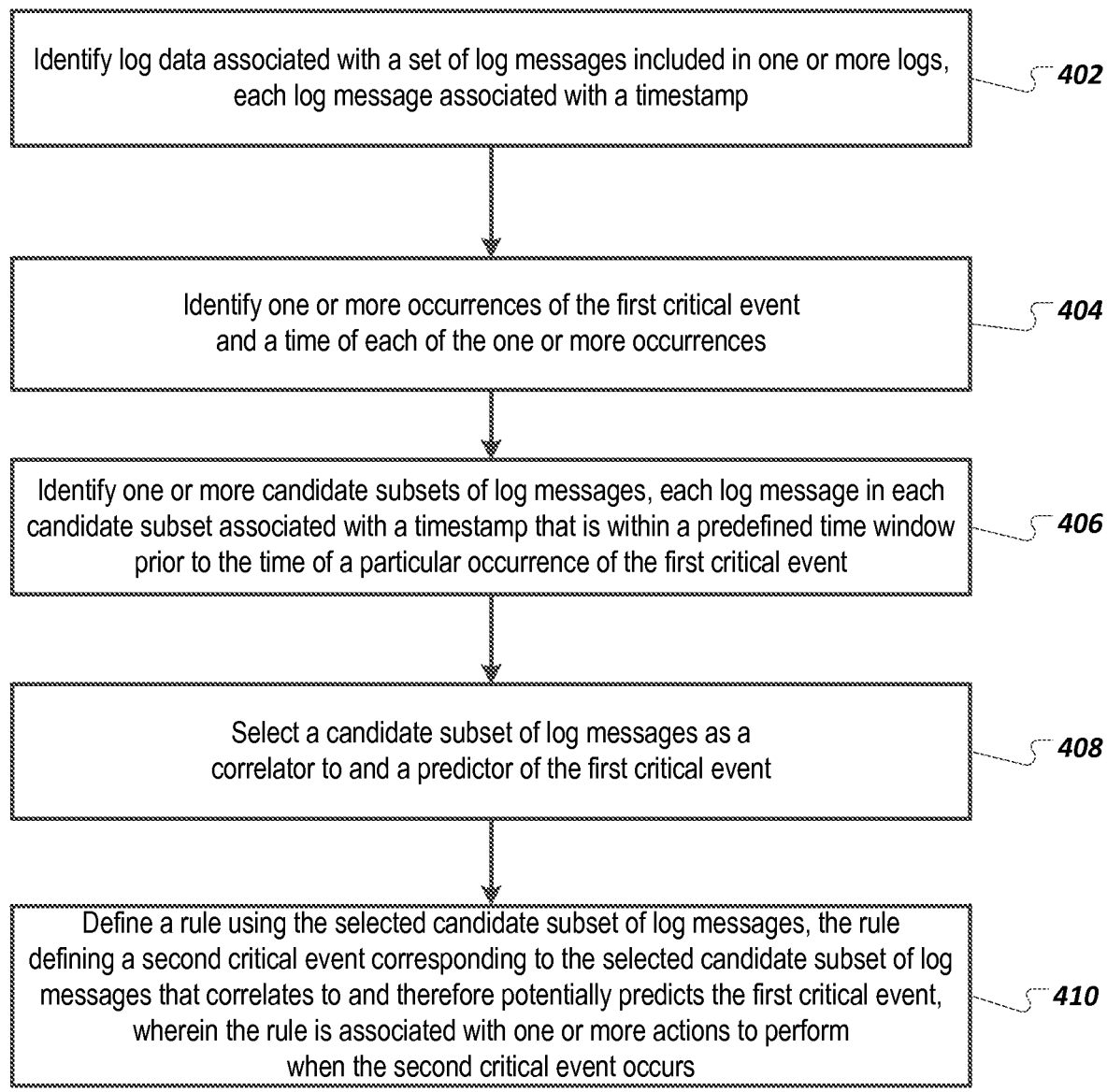
FIG. 4 is a flowchart of an example method for correlating log data to critical events.

FIG. 4 is a flowchart of an example method 400 for correlating log data to critical events. It will be understood that method 400 and related methods may be performed, for example, by any suitable system, environment, software, and hardware, or a combination of systems, environments, software, and hardware, as appropriate. For example, one or more of a client, a server, or other computing device can be used to execute method 400 and related methods and obtain any data from the memory of a client, the server, or the other computing device. In some implementations, the method 400 and related methods are executed by one or more components of the system 100 described above with respect to FIG. 1. For example, the method 400 and related methods can be executed by the log analyzer server 102 of FIG. 1.

At 402, log data associated with a set of log messages included in one or more logs is identified. Each log message is associated with a timestamp. The log data can be or include meta-data associated with the set of log messages. The metadata can include, for example, frequency and time of occurrence of each unique type of log message in the one or more logs. The identified log data can include copies of one or more of the log messages included in the one or more logs.

At 404, one or more occurrences of the first critical event and a time of each of the one or more occurrences are identified. In some implementations, some or all of the occurrences are identifiable from one or more log messages included in the one or more logs. In some implementations, some or all of the occurrences are not reflected in the one or more logs. For example, a particular occurrence of the first critical event can be identified by receiving a notification and the time of the particular occurrence of the first critical event.

At 406, one or more candidate subsets of log messages is identified. Each log message in each candidate subset is associated with a timestamp that is within a predefined time window prior to the time of a particular occurrence of the first critical event. A candidate subset can include one log message or multiple log messages. The predefined time window can be, for example, two hours. The predefined time window can be different for different types of critical events. The predefined time window can change over time based on information determined, for example, by a correlation engine. For example, the correlation engine can learn, over time, a typical or maximum time difference between the time of a critical event (or a critical event of a particular type) and a time associated with a correlator log message that correlates to, and that may predict, the critical event.

At 408, one or more candidate subsets of log messages are selected as a correlator to and predictor of the first critical event. For example, a likelihood that a respective candidate subset of log messages correlates to the first critical event can be determined for each of the one or more candidate subsets of log messages and a candidate subset of log messages can be selected as the correlator or predictor of the first critical event based on the determined likelihoods. The likelihood for a particular candidate subset of log messages can be based on a candidate subset of log messages including one or more log messages that are related to the first critical event. For example, one or more of the log messages in the particular candidate subset of log messages can include one or more keywords that match or are otherwise associated with a keyword associated with the first critical event. An increase in the likelihood for the particular candidate subset of log messages can be based on the number of log messages in the candidate subset of log messages that are related to the first critical event, with a higher number of related log messages resulting in a higher increase of the likelihood.

A likelihood can be or can be associated with a specific correlation- or prediction-likelihood score. In some implementations, when a candidate subset of log messages includes more than one log message, a likelihood score can be determined for each of the log messages in the candidate subset, and an aggregate likelihood score for the candidate subset can be determined based on the respective likelihoods for the messages in the subset. The aggregate likelihood score can be, for example, an average likelihood score of the log messages in the candidate subset.

The likelihood for a particular candidate subset of log messages can be based on a number of times that each log message in the particular candidate subset of log messages occurs in the log data within the predetermined time window before one of the identified occurrences of the first critical event. For example, suppose that five different occurrences of the first critical event have been identified and that for each respective occurrence of the five occurrences, the log messages included in a first candidate subset of log messages appear in log data with timestamps before the time of the respective occurrence. Suppose also that the log messages included in a second candidate subset of log messages appear in log data with timestamps before only three respective occurrences. The likelihood for the first candidate subset of log messages can be higher than the likelihood for the second candidate subset of log messages.

As another example, the likelihood for a particular candidate subset of log messages can be based on a log message level of one or more of the log messages in the particular candidate subset of log messages. For example, a first candidate subset that includes higher level log messages can have a higher likelihood than a second candidate subset that includes lower level log messages.

The likelihood for a particular candidate subset of log messages can be based on a frequency of the type of one or more logs messages in the particular candidate subset of log messages. For example, a first candidate subset of log messages that includes messages which have a high frequency can have a lower likelihood than a second candidate subset of log messages which have a lower frequency. A log message that occurs with a high frequency may not be a good correlator log message, since many or most of the instances of the log message will not be followed by an occurrence of the critical event. However, if a log messages occurs infrequently or only once, and is followed by an occurrence of the critical event, that log message may have a strong correlation to and therefore be a good predictor of the critical event.

In some implementations, a selected candidate subset of log messages is automatically selected, without human intervention, as the correlator of the first critical event based on the determined likelihoods. In some implementations, one or more of the candidate subsets of log messages are presented to a user and a user selection of a presented candidate subset of log messages is received as the selected candidate subset of log messages.

At 410, a rule is defined using the selected candidate subset of log messages. The rule defines a second critical event corresponding to the selected candidate subset of log messages that correlates to and therefore potentially predicts the first critical event. The rule is associated with one or more actions to perform when the second critical event occurs. In some implementations, the definition of the rule and a definition of the one or more actions are received from a user. The actions can include one or more actions to prevent a future occurrence of the first critical event. The actions can be performed automatically, upon detection of an occurrence of the second critical event, to prevent a future occurrence of the first critical event. The actions can include one or more actions to prepare for, counteract, minimize the impact of, or send a notification regarding an imminence of a future occurrence of the first critical event. To name a few examples, the actions can include freezing a virtual machine, backing up a database, switching to another database, changing environment settings, stopping an application, stopping a server, switching to another server, starting an application, starting a server, increasing the log level of an application, or dynamically allocating additional memory to a process.

The above description describes a correlation engine looking for log events that may correlate to and therefore predict a critical event. In some implementations, the correlation engine may determine that log events that were expected to be in log data (e.g., based on previously gathered metrics) are not in fact in the log data at a particular time or in a particular time window. If the lack of one or more regular log entries precedes an occurrence of a critical event, the correlation engine can determine that the lack of the one or more regular log entries may correlate to and possibly predict, at least in part, the occurrence of the critical event.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An event log analyzer comprising:
   one or more computers; and
   a computer-readable medium coupled to the one or more computers having instructions stored thereon which, when executed by the one or more computers, cause the one or more computers to perform operations comprising:
   identifying log data associated with a set of log messages included in one or more logs, for a system being monitored, wherein each log message is associated with a timestamp;
   receiving information regarding one or more occurrences of a first critical event and a time of each of the one or more occurrences, wherein the received information regarding the one or more occurrences of the first critical event is not included in the log data;
   identifying one or more candidate subsets of log messages, each log message in each candidate subset associated with a timestamp that is within a predefined time window prior to the time of a particular occurrence of the first critical event;
   determining a likelihood for each identified candidate subset of log messages that indicates a probability that a respective candidate subset of log messages correlates to the first critical event;

determining that a first candidate subset of log messages is a predictor of a future occurrence of the first critical event based on the likelihood for the first candidate subset of log messages being more than a predefined threshold likelihood;

automatically, without human intervention, defining a rule using the determined first candidate subset of log messages based on the first candidate subset of log messages having a likelihood greater than the threshold likelihood, the rule defining a second critical event to be an occurrence of the determined first candidate subset of log messages that predicts the future occurrence of the first critical event, wherein the rule is associated with one or more actions to automatically perform when the second critical event occurs, to alter the system being monitored, to automatically prevent a future occurrence of the first critical event;

after the rule has been defined, automatically detecting an occurrence of the second critical event based on detecting the first candidate subset of log messages in the one or more logs; and in response to automatically detecting the occurrence of the second critical event:
identifying the one or more actions associated with the rule; and
automatically performing the one or more actions, to alter the system being monitored, to automatically prevent a future occurrence of the first critical event.

2. The event log analyzer of claim 1, wherein determining that the candidate subset of log messages is the predictor of the future occurrence of the first critical event comprises:
presenting one or more of the candidate subsets of log messages to a user, each of the one or more candidate subsets associated with a score associated with a projected likelihood of critical event correlation; and
receiving, as the determined candidate subset of log messages, a user selection of a presented candidate subset of log messages.

3. The event log analyzer of claim 2, wherein defining the rule comprises receiving, from the user, the definition of the rule and a definition of the one or more actions.

4. The event log analyzer of claim 1, wherein the likelihood for a particular candidate subset of log messages is based on one or more of the log messages in the particular candidate subset of log messages including one or more keywords that match a keyword associated with the first critical event.

5. The event log analyzer of claim 1, wherein the likelihood for a particular candidate subset of log messages is based on a number of times that each log message in the particular candidate subset of log messages occurs in the log data within the predetermined time window before one of the identified occurrences of the first critical event.

6. The event log analyzer of claim 1, wherein the likelihood for a particular candidate subset of log messages is based on a log message level of one or more of the log messages in the particular candidate subset of log messages.

7. The event log analyzer of claim 1, wherein the log data comprises meta-data associated with the set of log messages, including frequency and time of occurrence of each unique type of log message in the one or more logs.

8. The event log analyzer of claim 1, wherein the likelihood for a particular candidate subset of log messages is based on a frequency of the type of one or more logs messages in the particular candidate subset of log messages.

9. The event log analyzer of claim 1, the one or more computers further performing operations comprising:
identifying an occurrence of the second critical event associated with a satisfaction of the rule; and
performing the set of actions based on identifying the occurrence of the second critical event.

10. The event log analyzer of claim 1, wherein the actions include one or more of changing environment settings, stopping an application, stopping a server, starting an application, starting a server, or increasing the log level of an application.

11. The event log analyzer of claim 1, wherein the actions include one or more actions to prepare for and send a notification regarding an imminence of a future occurrence of the first critical event.

12. The event log analyzer of claim 1, the one or more computers further performing operations comprising:
determining that an absence of an expected set of one or more log messages predicts the future occurrence of the first critical event; and wherein defining the rule comprises specifying that the absence of the expected set of one or more log messages predicts the future occurrence of the first critical event.

13. A computer program product encoded on a non-transitory storage medium, the product comprising non-transitory, computer readable instructions for causing one or more processors to perform operations comprising:
identifying log data associated with a set of log messages included in one or more logs, for a system being monitored, wherein each log message is associated with a timestamp;
receiving information regarding one or more occurrences of a first critical event and a time of each of the one or more occurrences, wherein the received information is not included in the log data;
identifying one or more candidate subsets of log messages, each log message in each candidate subset associated with a timestamp that is within a predefined time window prior to the time of a particular occurrence of the first critical event;
determining a likelihood for each identified candidate subset of log messages that indicates a probability that a respective candidate subset of log messages correlates to the first critical event;
determining that a first candidate subset of log messages is a predictor of a future occurrence of the first critical event based on the likelihood for the first candidate subset of log messages being more than a predefined threshold likelihood;
automatically, without human intervention, defining a rule using the determined first candidate subset of log messages based on the first candidate subset of log messages having a likelihood greater than the threshold likelihood, the rule defining a second critical event to be an occurrence of the determined first candidate subset of log messages that predicts the future occurrence of the first critical event, wherein the rule is associated with one or more actions to automatically perform when the second critical event occurs, to alter the system being monitored, to automatically prevent a future occurrence of the first critical event;
after the rule has been defined, automatically detecting an occurrence of the second critical event based on detecting the candidate subset of log messages in the one or more logs; and
in response to automatically detecting the occurrence of the second critical event:

identifying the one or more actions associated with the rule; and automatically performing the one or more actions, to alter the system being monitored, to automatically prevent a future occurrence of the first critical event.

* * * * *